(12) United States Patent
Koeppe

(10) Patent No.: US 7,724,465 B2
(45) Date of Patent: *May 25, 2010

(54) TAPE HEADS FOR USE WITH MULTIPLE TAPE FORMATS

(75) Inventor: Peter VanderSalm Koeppe, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/431,486

(22) Filed: Apr. 28, 2009

(65) Prior Publication Data

US 2009/0207524 A1    Aug. 20, 2009

Related U.S. Application Data

(63) Continuation of application No. 11/855,899, filed on Sep. 14, 2007, now Pat. No. 7,570,450.

(51) Int. Cl.
*G11B 5/58* (2006.01)
*G11B 21/02* (2006.01)

(52) U.S. Cl. .................... 360/77.01; 360/75
(58) Field of Classification Search ........... None
See application file for complete search history.

(56) References Cited

U.S. PATENT DOCUMENTS

| | | | |
|---|---|---|---|
| 5,436,780 A | 7/1995 | Nagata et al. ............ 360/121 |
| 5,867,339 A | 2/1999 | Panish et al. ............ 360/76 |
| 6,088,184 A | 7/2000 | Hu ............ 360/76 |
| 6,188,532 B1 | 2/2001 | Albrecht et al. ............ 360/63 |
| 6,331,920 B1 | 12/2001 | Albrecht et al. ............ 360/63 |
| 6,469,867 B2 | 10/2002 | Saliba ............ 360/122 |
| 6,992,857 B2 | 1/2006 | Knowles et al. ............ 360/77.12 |
| 6,999,268 B2 | 2/2006 | Hoerger ............ 360/77.12 |
| 7,154,691 B2 | 12/2006 | Girvin et al. ............ 360/61 |
| 7,239,465 B1 | 7/2007 | Watson et al. ............ 360/55 |
| 7,414,811 B2 | 8/2008 | Biskeborn ............ 360/129 |
| 7,570,450 B2 | 8/2009 | Koeppe ............ 360/75 |
| 2005/0134989 A1 | 6/2005 | Girvin et al. ............ 360/61 |

(Continued)

FOREIGN PATENT DOCUMENTS

JP    11273023 A    10/1999

OTHER PUBLICATIONS

International Search Report and Written Opinion from PCT Application No. PCT/EP2008/061914 mailed on Nov. 25, 2008.

(Continued)

*Primary Examiner*—K. Wong
(74) *Attorney, Agent, or Firm*—Zilka-Kotab, PC

(57) ABSTRACT

A magnetic head according to one embodiment includes an array of elements, the elements being selected from a group consisting of data readers, data writers, and combinations thereof; wherein a first subset of the elements is operable for reading or writing data in a first tape format, wherein a second subset of the elements is operable for reading or writing data in a second tape format, at least some of the elements being present in both subsets, wherein a number of servo bands supported in each of the formats is one more than a number of data bands on a medium written in the particular format.

20 Claims, 8 Drawing Sheets

U.S. PATENT DOCUMENTS

| | | | |
|---|---|---|---|
| 2007/0047142 A1 | 3/2007 | Biskeborn | 360/129 |
| 2007/0047146 A1 | 3/2007 | Biskeborn et al. | 360/240 |
| 2007/0091505 A1 | 4/2007 | Koeppe | 360/121 |
| 2008/0030886 A1 | 2/2008 | Biskeborn et al. | 360/75 |

OTHER PUBLICATIONS

Office Action Summary from U.S. Appl. No. 11/855,899 mailed on Sep. 17, 2008.

Notice of Allowance from U.S. Appl. No. 11/855,899 mailed on Mar. 30, 2009.

TAPE HEADS FOR USE WITH MULTIPLE TAPE FORMATS

RELATED APPLICATIONS

This application is a continuation of U.S. patent application Ser. No. 11/855,899, filed Sep. 14, 2007 now U.S. Pat. No. 7,570,450, which is herein incorporated by reference.

FIELD OF THE INVENTION

The present invention relates to magnetic head structures, and more particularly, this invention relates to a magnetic head structure capable of reading and/or writing in multiple formats.

BACKGROUND OF THE INVENTION

Business, science and entertainment applications depend upon computing systems to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical and convenient means of storing or archiving the data. Storage technology is continually pushed to increase storage capacity and storage reliability. Improvement in data storage densities in magnetic storage media, for example, has resulted from improved medium materials, improved error correction techniques and decreased areal bit sizes. The data capacity of half-inch magnetic tape, for example, is now measured in hundreds of gigabytes on 896 or more data tracks.

FIG. 1 illustrates a traditional flat-lapped bi-directional, two-module magnetic tape head 100, in accordance with the prior art. As shown, the head includes a pair of bases 102, each equipped with a module 104. The bases are typically "U-beams" that are adhesively coupled together. Each module 104 includes a substrate 104A and a closure 104B with readers and writers 106 situated therebetween. In use, a tape 108 is moved over the modules 104 along a tape bearing surface 109 in the manner shown for reading and writing data on the tape 108 using the readers and writers 106. Conventionally, a partial vacuum is formed between the tape 108 and the tape bearing surface 109 for maintaining the tape 108 in close proximity with the readers and writers 106.

FIG. 2A illustrates the tape bearing surface 109 of one of the modules 104. The tape 108 is shown in dashed lines. The module is long enough to be able to support the tape as the head steps between data tracks.

As shown, the tape 108 includes four data bands (Band 0-3) that are defined between servo tracks 202. Each data band may include a number of data tracks, for example 224 data tracks (not shown). During read/write operations, the elements 106 are positioned within one of the data bands. Outer readers, sometimes called servo readers, read the servo tracks 202. The servo signals are in turn used to keep the elements 106 aligned with a particular track during the read/write operations. Typically, a coarse positioner (worm gear, etc.) places the head generally adjacent a given data track, then a fine positioner (voice coil, etc.) keeps the heads aligned using the servo tracks.

FIG. 2B depicts a plurality of read/write elements 106 formed in a gap 208 on the module 104 of FIG. 2A. As shown, the array of elements 106 includes, for example, sixteen writers 209, sixteen readers 210 and two servo readers 212. As noted by considering FIGS. 1 and 2A-B together, each module 104 will include a complementary set of elements 106.

One designing magnetic storage systems, such as tape storage systems, strives to increase the data density of the medium. As a means for adding more data to a given area of a magnetic medium, succeeding generations of tape formats are born. Typically, newer formats may include more data bands as well as more data tracks per data band and/or width of the tape, and also improvements in data linear density.

On any head, both the spacing between the elements and the element dimensions conform to a particular tape format. Usually, a head designed for one format will not work with a tape written in another format, as the servo readers usually will not align with the servo tracks. In addition the data elements may not align with the written tracks. Accordingly, one wishing to keep data stored on a magnetic medium in one format but wishing to move to equipment in a new format must either keep an operational drive designed for the earlier format, or transfer the data to a medium in the new format.

One known attempt to provide a multi-format head 300 is shown in FIG. 3. As shown, the head 300 includes four modules 302A, 302B, 303A, 303B aligned parallel to the direction of tape travel. The outer pair of modules 302A, 302B each have an array of elements 304A, 304B arranged according to a first tape format, while the inner pair of modules 303A, 303B each have an array of elements 306A, 306B for a second tape format, the second tape format different than the first tape format. In both pairs, the complementary elements (304A with 304B, 306A with 306B) are displaced from each other in the direction of tape travel. However, these types of heads are very expensive to manufacture, as several independent modules 302A, 302B, 303A, 303B must first be fabricated. Also, once manufactured, the modules 302A, 302B, 303A, 303B must be precisely aligned, considering the critical wrap angles between the modules as well as the outer wrap angles. In addition, because of the larger spacing between the outer modules 302A, 302B, the head will be more susceptible to errors due to tape wobble. For example, in read-while-write operation, the readers on the trailing module 302B read the data that was just written by the leading module 302A so that the system can verify that the data was written correctly. If the data is not written correctly, the system recognizes the error and rewrites the data. However, the tape does not move across the head perfectly linearly. Rather, the tape may shift back and forth, or "wobble," as it crosses the tape bearing surfaces, resulting in dynamic skew, or misalignment of the trailing readers with the leading writers. The farther the readers are behind the writers, the more chance that track misregistration will occur. If it does occur, the system may incorrectly believe that a write error has occurred.

Another known attempt to provide a multi-format head 400 is shown in FIG. 4. This tape head 400 is configured as a Read-Read-Write (R-R-W) head. Tape head 400 includes merged primary tape format read/write elements 404A, 404B and secondary tape format read elements 406A, 406B on each module 402A, 402B. In this instance, head 400 is capable of reading a secondary format corresponding to secondary format read elements 406A, 406B. Head 400 is further capable of both reading and writing with the primary format corresponding to primary read/write elements 404A, 404B.

With continued reference to FIG. 4, the primary and secondary elements 404A, 404B, 406A, 406B are aligned parallel to the direction of tape travel. Typically, each row of elements is fabricated in sequential fabrication sequences. For example, elements 404A, 404B may be formed first. Then the secondary elements 406A, 406B are fabricated above the primary elements 404A, 404B. However, this type of "stacked" head is complex and expensive to fabricate, as each row of elements 404A, 404B, 406A, 406B must be fabricated independently. Further, an error in processing late in the fabrication process can result in an expensive loss. Additionally, the electrical connections that would be necessary to traverse the multiple layers for so many devices would be very complex.

In addition to fabrication issues, modules implementing stacked rows of element also suffer from reliability issues. For instance, the head will run hotter, as the heat sinking effect of the substrate will be reduced. Particularly, if the upper array is being used, heat will have to travel through several layers of devices do reach the substrate. A further issue is the thick gap that would be required in order to accommodate stacked arrays. Tape irregularities tend to droop slightly into this gap and erode the elements. This produces head-tape spacing problems, such as declining signal resolution. Gap wear can also lead to debris deposition issues such as shorting.

There is accordingly a clearly-felt need in the art for a magnetic head assembly capable of reading and/or writing in multiple formats, yet that is simple and less expensive to manufacture. It would be desirable to be able to read and write multiple formats for such things as backward compatibility, as well as compatibility across competing formats.

SUMMARY OF THE INVENTION

A magnetic head according to one embodiment includes an array of elements, the elements being selected from a group consisting of data readers, data writers, and combinations thereof, wherein a first subset of the elements is operable for reading or writing data in a first tape format, wherein a second subset of the elements is operable for reading or writing data in a second tape format, at least some of the elements being present in both subsets, wherein a number of servo bands supported in each of the formats is one more than a number of data bands on a medium written in the particular format.

A magnetic head according to another embodiment includes a first array of elements associated with a first tape format, the elements of the first array being selected from a group consisting of data readers, data writers, and combinations thereof, a second array of elements interspersed with the first array of elements, the elements of the second array being selected from a group consisting of data readers, data writers, and combinations thereof, the second array of elements and a subset of the first array of elements being associated with a second tape format; and servo readers for reading servo bands on a tape, wherein a spacing of the servo bands on a tape written in the first format is different than a spacing of servo bands on a tape written in the second format.

A magnetic head according to yet another embodiment includes an array of elements, the elements being selected from a group consisting of data readers, data writers, and combinations thereof, wherein a first subset of the elements is operable for reading or writing data in a first tape format, wherein a second subset of the elements is operable for reading or writing data in a second tape format, at least some of the elements being present in both subsets, wherein the elements are aligned laterally along a line transverse to the direction of travel of the magnetic medium over the head, wherein a center-to-center spacing of the elements in the first subset of elements is at least one of an integer multiple and an integer ratio of a center-to-center spacing of the elements in the second subset of elements.

Any of the various embodiments may be implemented in a tape drive system, which may generally include a magnetic head; a drive mechanism for passing a magnetic recording tape over the head; and a controller in communication with the head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior Art

Prior Art

Prior Art

Prior Art

DETAILED DESCRIPTION

Figure 1:
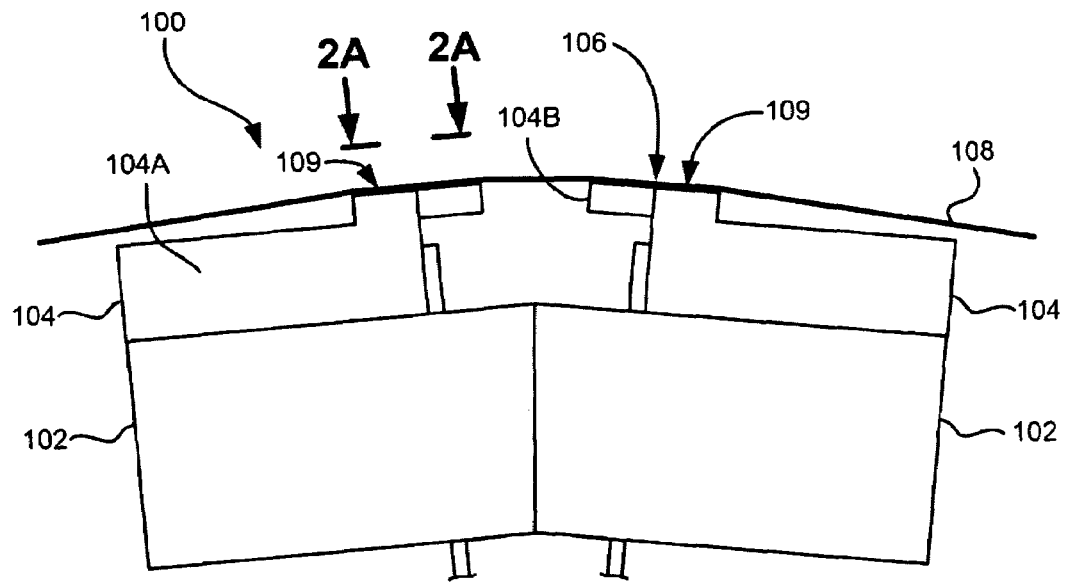
FIG. 1 is a side view of a traditional flat-lapped magnetic tape head, in accordance with the prior art.
Figure 2B:
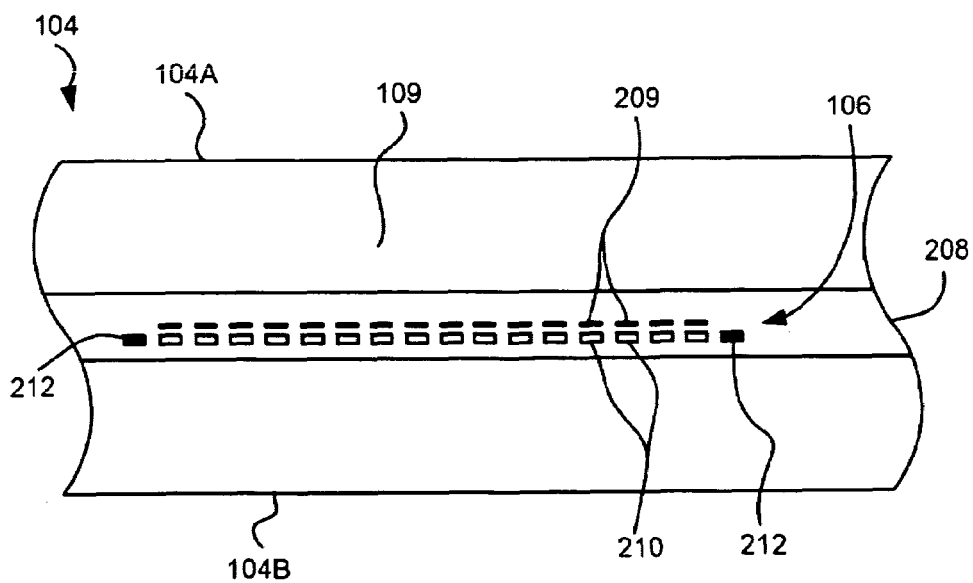
FIG. 2B is a detailed view taken from Circle 2B of FIG. 2A.
Figure 2A:
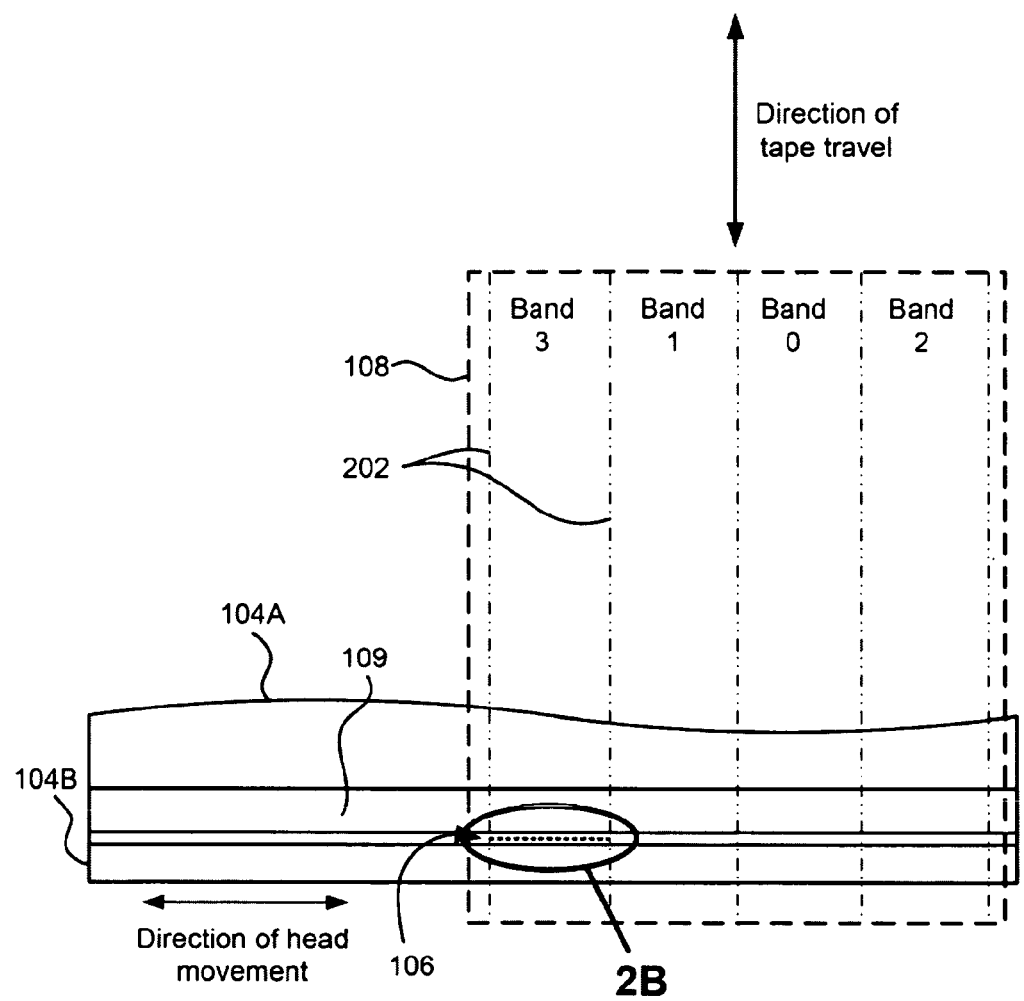
FIG. 2A is a tape bearing surface view taken from Line 2A of FIG. 1.
Figure 4:
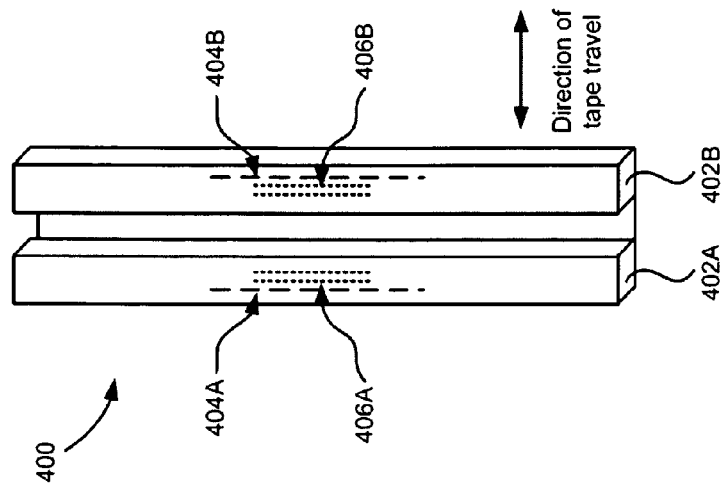
FIG. 4 is a tape bearing surface view of a head including multiple format read/write element arrays on the same module.
Figure 3:
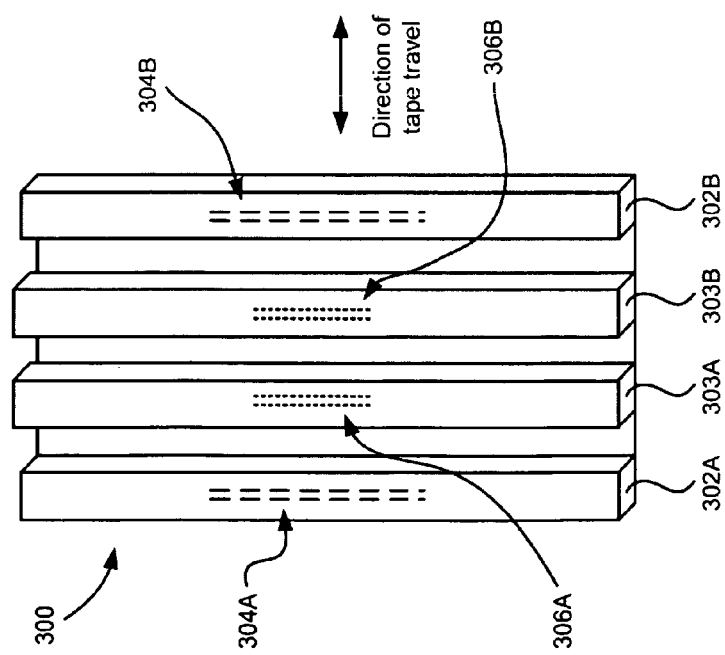
FIG. 3 is a tape bearing surface view of a head including multiple format read/write elements on different modules.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

The following description discloses several preferred embodiments of tape-based storage systems, as well as operation and/or component parts thereof.

While the following description will be described in terms of a tape storage system for clarity and to place the invention in context, it should be kept in mind that the teachings herein may have broad application to all types of magnetic recording.

The embodiments described below disclose a new head design that is capable of reading and/or writing to magnetic media such as magnetic tape in multiple formats. For example, the head can write and/or read data in both legacy and advanced formats, and in doing so can enable full backward compatibility with legacy media types. This is an important criterion for customers wishing to move to a new format yet having data stored on media in an older format.

A magnetic head according to one general approach includes an array of elements, the elements being selected from a group consisting of data readers, data writers, and combinations thereof. A first subset of the elements is operable for reading and/or writing data in a first tape format, while a second subset of the elements is operable for reading and/or writing data in a second tape format, at least some of the elements being present in both subsets. A spacing of servo bands on a tape written in the first format is different than a spacing of servo bands on a tape written in the second format.

A magnetic head according to another general approach includes a first array of elements associated with a first tape format, the elements of the first array being selected from a group consisting of data readers, data writers, and combinations thereof, and a second array of elements interspersed with the first array of elements, the elements of the second array being selected from a group consisting of data readers, data writers, and combinations thereof, the second array of elements and a subset of the first array of elements being associated with a second tape format. Also present are servo readers for reading servo bands on a tape, where a number of servo bands supported in each of the formats is one more than a number of data bands in the particular format.

A magnetic head according to yet another general embodiment includes an array of elements, the elements being selected from a group consisting of data readers, data writers, and combinations thereof. A first subset of the elements is operable for reading or writing data in a first tape format. A second subset of the elements is operable for reading or writing data in a second tape format, at least some of the elements being present in both subsets. The elements are aligned laterally along a line transverse to the direction of travel of the magnetic medium over the head. A spacing of servo bands on a tape written in the first format is different than a spacing of servo bands on a tape written in the second format.

As mentioned above with reference to FIG. 1, a typical tape head includes two modules, each module having an array of data elements thereon for reading and/or writing data in a particular data format. The present invention includes a new two module head capable of reading and/or writing in two different data formats. One skilled in the art will also appreciate that the embodiments herein can also be expanded to heads having a single module (where, for example, the single module may be formed on a single substrate) and heads having more than two modules. The latter are described in more detail below.

Figure 5:
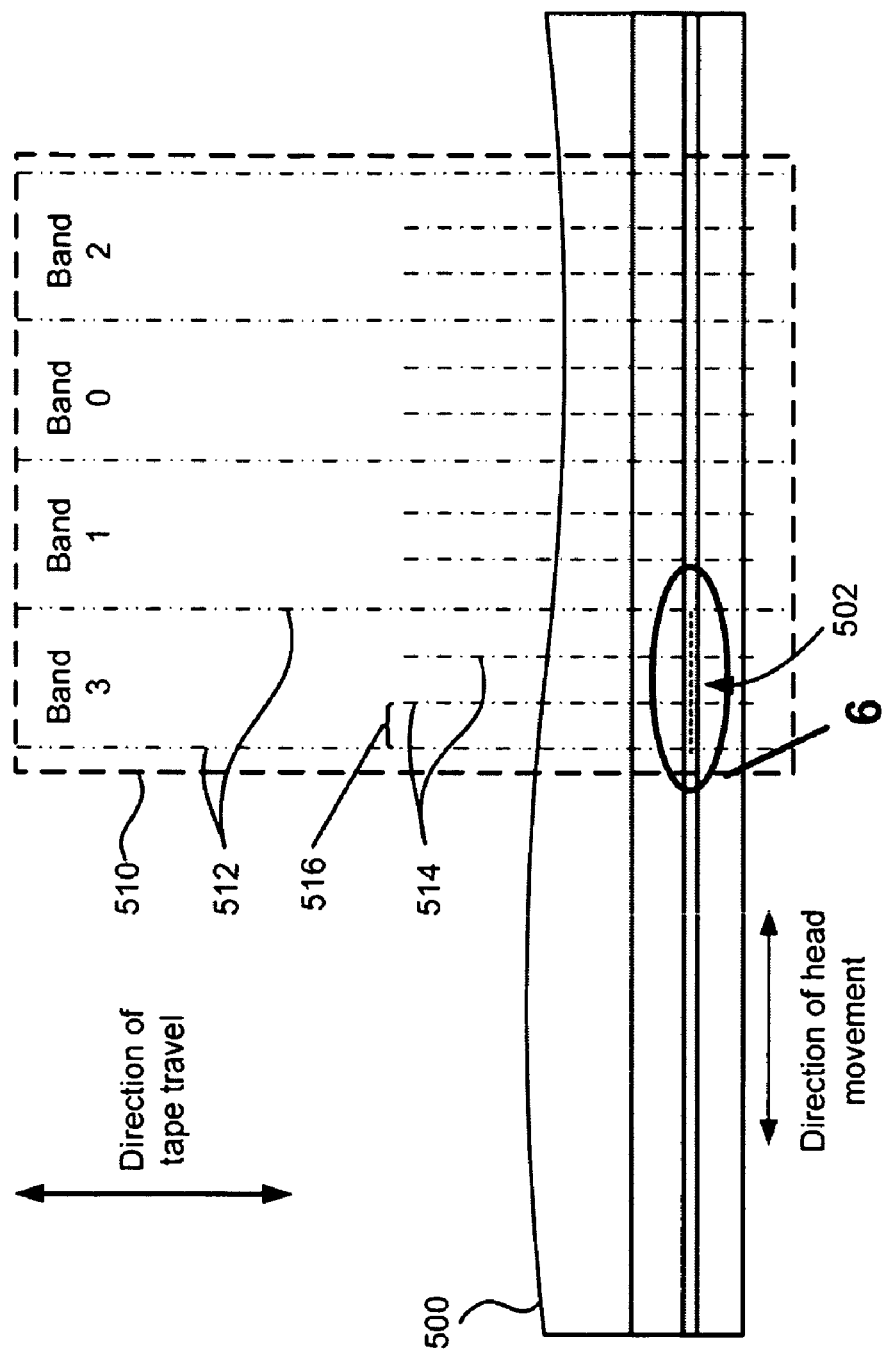
FIG. 5 is a tape bearing surface view of a tape head including two subsets of elements on the same module, each subset being adapted for a different format.

FIG. 5 illustrates a tape bearing surface view of an exemplary module 500 having an array 502 of elements. In one approach, shown generally in FIGS. 6-7, a first subset of the elements is operable for reading and/or writing data in a first tape format, while a second subset of the elements is operable for reading and/or writing data in a second tape format, at least some of the elements being present in both subsets, and where the first and second data formats are different. The first and second subsets can also be thought of as first array of elements with a second array of elements interspersed therein, where the second array of elements and a subset of the first array of elements are associated with a second tape format.

Again, the elements can include readers, writers, or both. Depending on the format, the proper subset is aligned with a given data band in a conventional way, e.g., by servoing.

With continued reference to FIG. 5, the tape 510 is shown in dashed lines. While it is not typical to write data in two different formats on the same tape, the present embodiment would enable this feature, as described below. To illustrate different formats, FIG. 5 shows data in the first and second formats overlapping. This is for illustration purposes, and one skilled in the art will appreciate that the data bands in the two formats would not typically be concurrently present on the same area of the tape. Data in the first format is associated with servo bands 512 and data bands (Band 0-3). Data in the second format is associated with servo bands 512 and 514. The data bands 516 in the second format are significantly smaller and so are not individually identified alphanumerically. However, a representative data band 516 is shown in FIG. 5 for illustrative purposes.

In one preferred embodiment, the head includes servo readers for reading servo bands on the tape, where a number of servo bands supported in each of the formats is one more than a number of data bands in the particular format. Thus, as shown in the example of FIG. 5, there are five servo bands 512 for the four data bands (Band 0-3) written in the first format, while there are thirteen servo bands 514 for the twelve data bands written in the second format. It follows that in some embodiments, a number of servo readers associated with the array 502 of elements is no more than two times the number of formats supported.

In another preferred embodiment, the spacing of the servo bands on the tape written in the first format is different than a spacing of servo bands on a tape written in the second format.

The second data format may be a new generation relative to the first data format. The first and second data format may also be formats used by competing vendors, used in different standards, etc. Typically, the differences between formats will include one or more of: differing servo band locations, differing written track width, differing track density per data band or tape width, differing track centerline-to-centerline spacing, differing element centerline-to-centerline spacing, etc. Accordingly, the subsets will have servo reader position, element spacing, element width, etc. that are designed to function in the format with which associated.

In one embodiment, the second format is a scaled-down version of the first format, especially in feature size. Accordingly, the second subset in such embodiment is a scaled-down version of the first subset. For example, the second subset may have the same number of data tracks per band, but is scaled down from the first subset, for example by a factor of about 3. In other words, the second subset is about 33.3% the width of the first subset. Thus, the format characteristics are also scaled down. For example, the track density on the tape could increase by approximately 3× in the second format as compared to the first format. If the linear data density also doubles, the tape capacity in the second format will be 6× the first format.

With continued reference to FIG. 5, both subsets of the array 502 may be formed in the same gap on the module 500 and the elements of the arrays are interspersed with each other generally in a direction transverse to the direction of media travel.

In operation, the tape drive system or host system can identify the format of the servo pattern on the tape and/or the format of the data on the tape using one of several techniques. One way to determine the format(s) is by reading a cartridge memory chip in the tape cartridge that identifies the format. Another way to identify the format is by reading a small portion of the data bands and matching, for example, the servo bands to a look up table (LUT). Note that all subsets may be active at this time, or the system may sequentially operate the subsets. In other embodiments, the user may indicate which format is used on the tape. Once the format is identified, the controller, host, or user selects the proper subset for reading and writing. The system energizes the subset associated with the identified format, such as by energizing the leads coupled to the desired subset. Now active, the desired subset is aligned with one of the data bands in a standard way, e.g., by servoing, and the tape is passed over the head for reading/writing. Preferably, either one subset or the other is energized at a time during standard read/write operations.

In one embodiment, the elements for both subsets are built simultaneously during thin film buildup. For instance, consider elements in a "piggyback" configuration. This type of element typically includes a reader formed on a substrate, with a writer formed thereon. The reader and writer may be positioned so that one of the reader shields also functions as a pole for the writer, known as a merged transducer configuration. During construction of a multi-format piggyback head, the readers of the first subset are formed concurrently with the readers of the second subset. Then the writers of the first subset are formed concurrently with the writers of the second subset. The readers of the first and second subsets may be aligned along a line transverse to the direction of media travel, and thus the writers of both subsets may also be aligned. Likewise, for an interleaved head, the readers for both subsets can all be formed during a single processing sequence, and the writers can be formed in another processing sequence.

The subsets can be slightly offset in a vertical direction for design considerations. For example, the upper shields for readers in the first subset may be formed concurrently with the lower shields for readers in the second subset. Then the readers in the second subset are completed in subsequent steps. Thus, in some embodiments, the elements are formed concurrently in the same processing sequence, though only some of the processing steps affect both subsets.

In further embodiments, the subsets can be formed by independent processing sequences. For example, one subset can be completed prior to forming the other subset. The subsets may be aligned in a direction transverse to the direction of tape motion, or can be displaced transverse to the direction of tape travel and offset in a direction parallel to the direction of tape travel.

Further, each subset can be formed on an individual module, where selected elements may be displaced relative to other elements in a direction parallel to the direction of tape travel.

Forming the various subsets concurrently reduces process steps over the contemplated methods described above, such as forming elements in tandem parallel to the tape travel direction or even placing R/W subsets for different formats on different modules. One skilled in the art will appreciate the advantages achieved by processing all of the elements concurrently, including lower cost, faster production time, reduced chance of error, etc. Write and read transducer magnetic gaps may be independently optimized for each format.

Because the subsets of elements are interspersed, the width of the head does not need to be significantly increased. Typically, the width of the head may be based on the smallest format to ensure that the tape bearing surface supports the entire tape at all possible positions.

Figure 6:
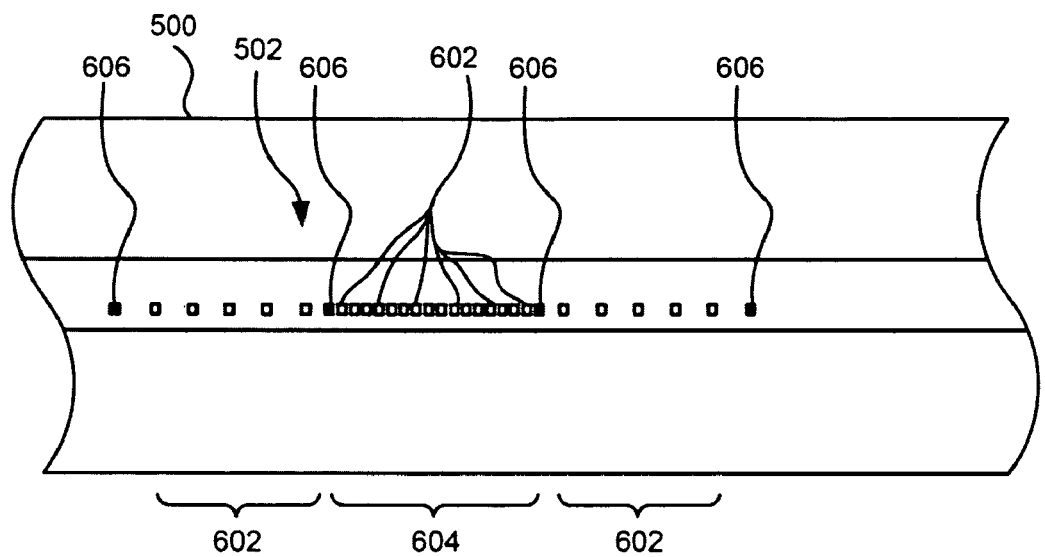
FIG. 6 is a detailed view taken from Circle 6 of FIG. 5 according to one embodiment.

One embodiment of the present invention is illustrated in FIG. 6, wherein two subsets 602, 604 of the array 502 are formed on a module 500. As shown, the second subset 604 includes some elements of the first subset 602. The number of elements in the first subset 602 may be the same as the number of elements in the second subset 604, e.g., 8 and 8, 16 and 16, 24 and 24, 32 and 32, etc. In other embodiments, the number of elements in the first subset 602 is different than a number of elements in the second subset 604, e.g., 8 and 16, 16 and 32, 16 and 8, 32 and 24, etc. While the number of elements in a given subset has been represented a multiple of a power of 2 (e.g., multiple of $8=2^3$), the number of elements in the array and/or the various subsets may be any number.

In some approaches, the elements in the first and second subsets have the same construction, while in other approaches the elements in the each subset has a different construction. Further, non-dual-use elements may have different design(s) from dual-use elements.

In the embodiment of FIG. 6, the elements are positioned generally laterally adjacent each other along a line transverse to the direction of travel of the magnetic medium over the head. However, some of the elements may be offset or misaligned.

Preferred embodiments employ individual pairs of servo readers 606 for each format. In the latter case, as shown in FIG. 5, the spacing of servo bands 512 on a tape written in the first format is different than a spacing of servo bands 514 on a tape written in the second format.

Figure 7:
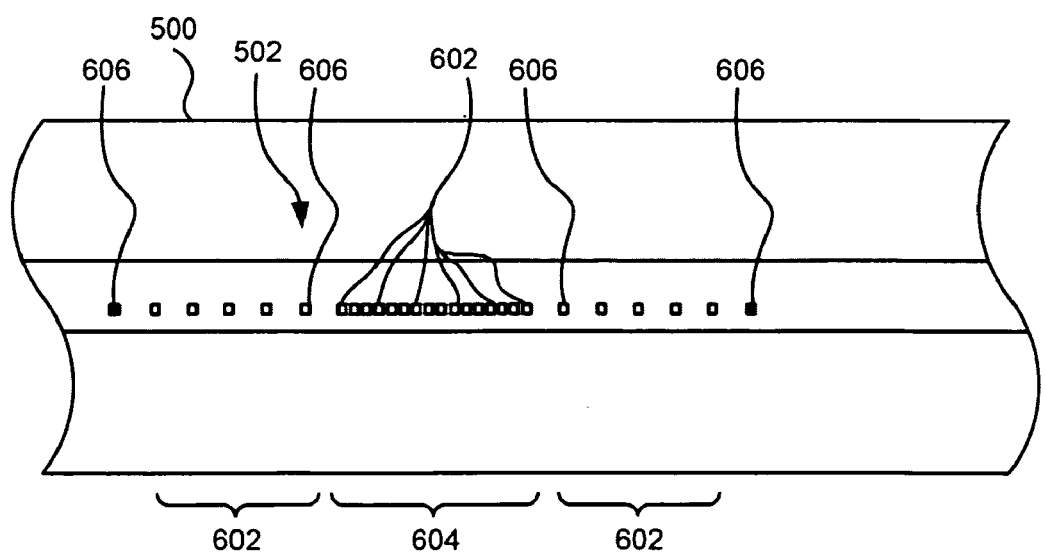
FIG. 7 is a detailed view of a tape bearing surface of a tape head according to another embodiment.

In another approach, shown generally in FIG. 7, at least one element of the first array (first subset) 602 functions as a servo reader 606 for the second array (second subset) 604.

The head as recited in claim 1, further comprising servo readers associated with the array of elements, a number of the servo readers being no more than two times the number of formats.

In yet other embodiments, the first and second subsets 602, 604 can share one of the servo readers 606.

In particularly preferred embodiments, it is generally preferred that there are no more than two servo readers for each supported format. Thus, where two formats are supported, there are preferably no more than four servo readers associated with an array of elements. However, more or less servo readers 606 may be present.

The following describes particularly preferred approaches. The spacing in the grid of one subset of elements (i.e., the transducer pitch or center-to-center distance) is an integer multiple (e.g., 3) (or an integer ratio [e.g., 3/2]) of the other(s). At least one member of each 'progressive pair' of subsets is common; i.e., one or more transducers are dual-use elements, used to write and/or read information in two (or more) formats. In this way, a reduced-span head is achieved which is also backward compatible. The element pitch reduction (e.g., integer multiple, say, 3) achieves the head span reduction (e.g., approximately 2×) and, optionally, an increase in the channel count (e.g., 1.5×). The element pitch reduction factor (e.g., 3×) is equal to an (approximate) head span reduction factor (e.g., 2×) times the channel count increase factor (e.g., 1.5×). Also, typically, the number of channels in the second format (e.g., 24)=the element pitch reduction factor (e.g., 3×) times the number of dual-use channels.

As an example, a first format array has a head element pitch of 166.5 μm across 16 channels, for a data transducer head span of 2497.5=(16−1)*166.5 μm. A second format has a head pitch of 55.5 μm across 24 channels, for a data transducer head span of 1276.5=(24−1)*55.5 μm. The element pitch reduction is 3×. The span reduction is approximately 2× (1.96). The channel count increase is 1.5×[3×=2×*1.5×]. In this example, the arrays (subsets) have the same centerline. There are a total of 32 data elements (data readers or data writers or data reader/writer pairs): 16=(8 dual-usage+8 first format only) are used simultaneously for the first format; 24=(8 dual-usage+16 second format only) are used simultaneously for the second format; 8 are dual-usage elements. (24 channels)=(8 dual-usage)*(3× element pitch reduction). Additionally, in this example, there are four (4) servo reader elements on each head module (2 each for each format). Two- or three-module heads could be formed into bidirectional write/read heads, having various appropriate combinations of data writer, data reader, and/or servo reader transducers.

This pair (or more) of merged arrays (subsets) may thus achieve a head compatible with both an 'old' format, and a 'new' format; wherein the 'new' format enables one or more of (1) track density and/or reader track width increases through head span reduction, (2) increased data rate and/or reduced tape speed enablement through an increased channel count, while (3) using a reduced element set (32 data elements in the above example instead of 40=16+24), minimizing the cost and complexity of each head module and its associated cable and, perhaps, the attached driving electronics, as well.

Figure 8:
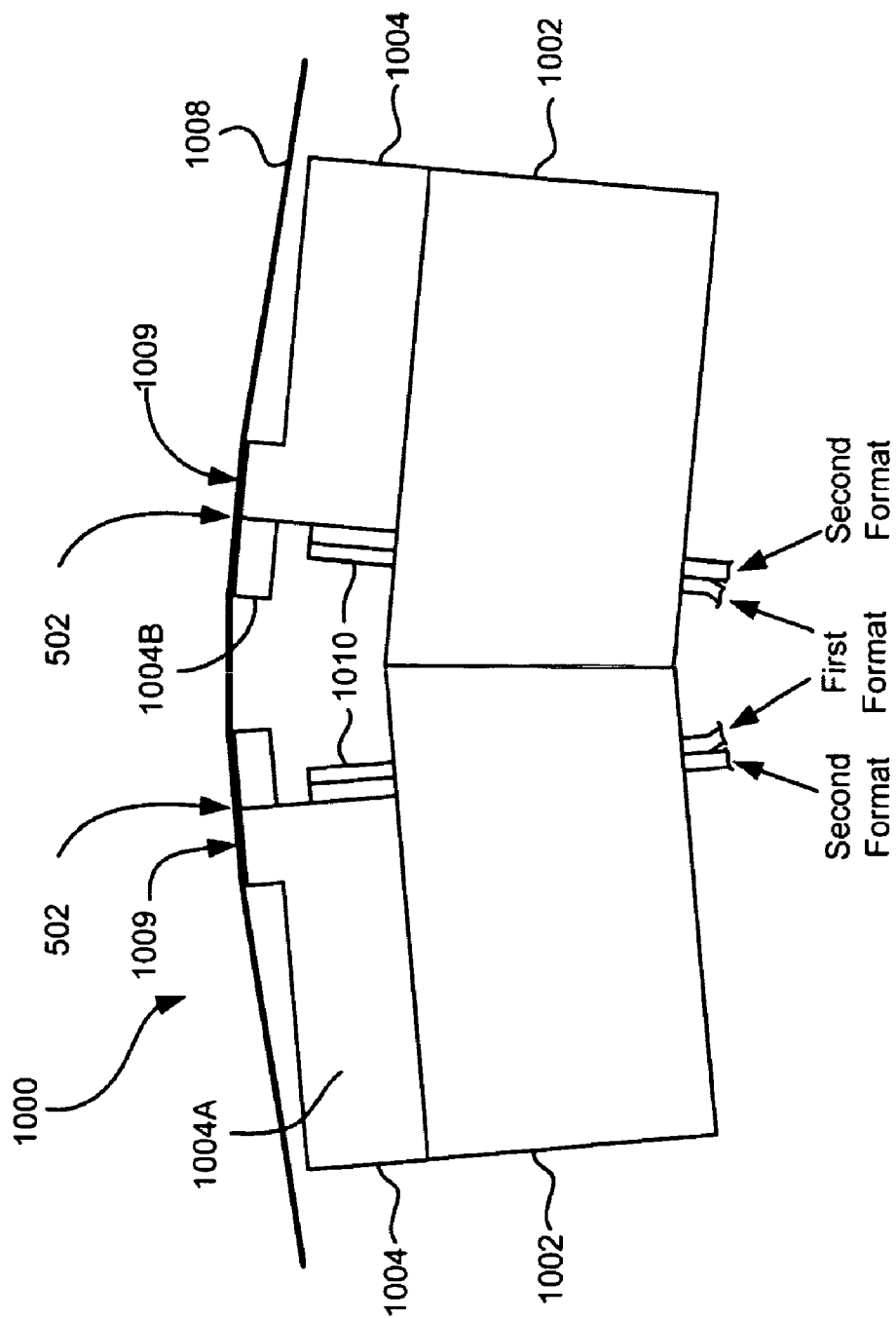
FIG. 8 is a side view of a tape head having two modules according to one embodiment.

As mentioned above, one way to build a head is to have two modules, in a configuration similar to existing heads, e.g., the head of FIG. 1. One such embodiment is shown in FIG. 8 illustrates a flat-lapped bi-directional, two-module magnetic tape head 1000. As shown, the head includes a pair of bases 1002, each equipped with a module 1004. The bases may be conventional U-beams that are adhesively coupled together. Each module 1004 includes a substrate 1004A and a closure 1004B with an array 502 of elements situated therebetween. Cables 1010 connect the elements to a controller. The cables 1010 are shown as split into leads for the two formats, but can be joined, fused, intermixed, overlayed, etc. Note that, because the first and second subsets share elements, only one pair of leads need be coupled to the shared elements, thereby simplifying cabling.

In use, a tape 1008 is moved over the modules 1004 along the tape bearing surfaces 1009 thereof for reading and writing data on the tape 1008. Depending on the format of the data or servo on the tape, or to be written to the tape, the subset of elements on each module corresponding to that format is activated and used to read and/or write to the tape.

Another way to build the head is to have the functions of reading and writing performed on different modules. As shown in the write-read-write (W-R-W) head 1100 of FIG. 9, outer writing modules 1102, 1104 flank a single reading module 1106. As the names imply, the outer modules 1102, 1104 include one or more arrays of writers in a configuration, for example, as shown in FIGS. 6-7. The reading module 1106 includes one or more arrays of readers. The modules 1102, 1104, 1106 are offset and set in relationship with each other such that internal wrap angles are defined between the modules 1102, 1104, 1106. Cables 1109 connect the elements to a controller. The cables 1109 are shown as split into leads for the two formats, but can be joined, fused, intermixed, overlayed, etc.

In this embodiment, the tape bearing surfaces of the modules lie on parallel planes, but are offset in a direction perpendicular to the planes. When the tape 1108 moves across the head 1100 as shown, air is skived from below the tape 1108 by a skiving edge 1110 of the first outer writing module 1102, and instead of the tape 1108 lifting from the tape bearing surface 1112 of the first outer module 1102 (as intuitively it should), the reduced air pressure in the area between the tape 1108 and the tape bearing surface 1112 allow atmospheric pressure to urge the tape towards the tape bearing surface 1112. The trailing end 1120 of the outer writing module 1102 (the end from which the tape leaves the outer writing module 1102) is the reference point which defines the wrap angle $\alpha_o$ over the tape bearing surface of the inner reading module 1106. The same is true of the other outer writing module 1104 when the tape travel direction is reversed.

Figure 9:
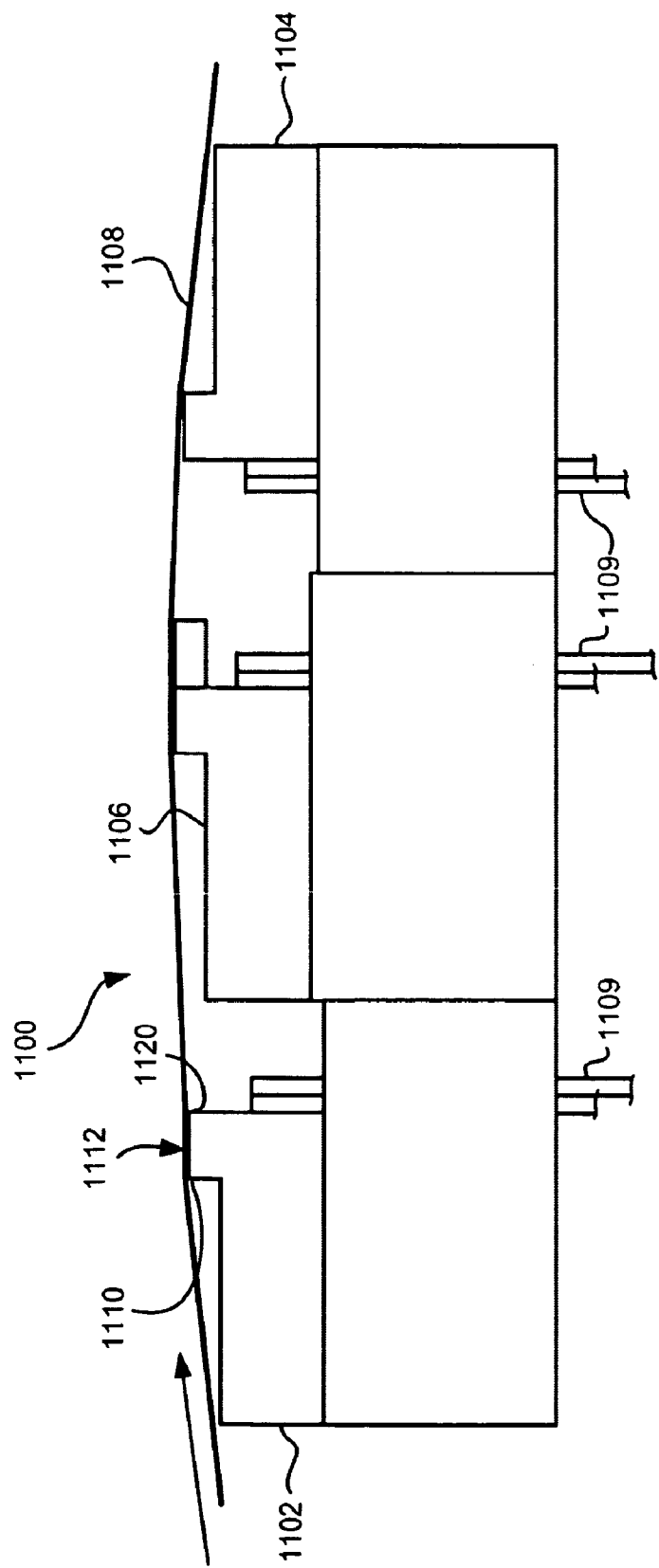
FIG. 9 is a side view of a tape head having three modules according to one embodiment.

Variations on the head 1100 of FIG. 9 include a R-W-R head, a R-R-W head, a W-W-R head, etc. For example, in a R-W-R head, the outer modules 1102, 1104 perform reading while the middle module 1106 performs writing. In a R-R-W head, the leading module 1102 and middle module 1106 perform reading while the trailing module 1104 performs writing. In a W-W-R head, the leading module 1102 and middle module 1106 perform writing while the trailing module 1104 performs reading. Again, the leading and trailing modules 1102, 1104 may operate concurrently with each other and the middle module 1106, may operate individually, or may operate in combinations of two modules.

An advantage of the multiple module head is that each module has no more wiring leads than a module in a two module head having both read and write elements. For instance, assume a legacy format head has 16 readers and 16 writers per module. Adding an array of second format elements would add 32 more elements, or 64 more wires. However, if each module has only readers or writers, albeit in two formats, the number of wires per module is the same as the legacy read/write head. Accordingly, existing cabling can be used, the number of wires per head is minimized, etc.

Another advantage is that air is entrained between the tape and the trailing outer module (1104 in FIG. 9), thereby reducing wear.

The three module design is also preferred, as the total gap thicknesses and build complexity are minimized, and head yield is optimized.

The invention is not limited to flat profile heads; heads having rounded and other geometric tape bearing surfaces are also within the spirit and scope of the present invention.

In any of the embodiments described herein, the heads can be fabricated in conventional ways. To reduce cost and complexity, one lead for an element of the first array may be commoned with one lead for an element of the second array (and so on for additional arrays) to minimize head wiring, an on-going goal in head design.

Figure 10:
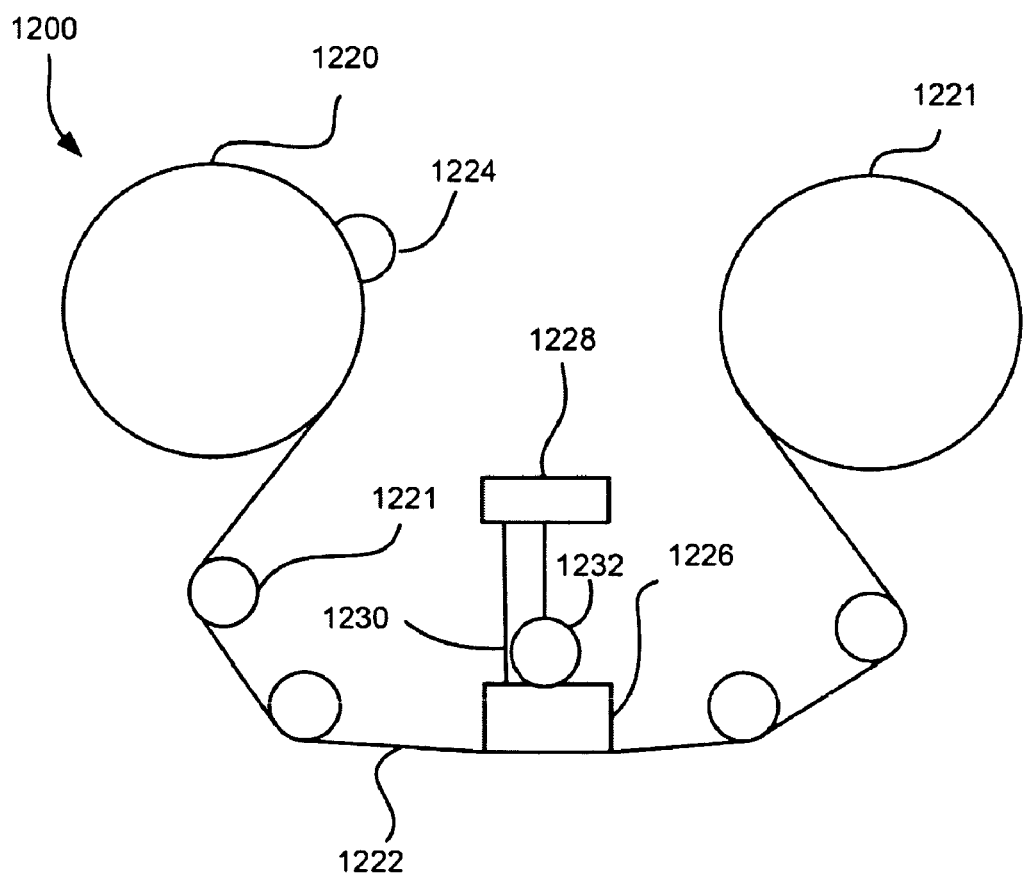
FIG. 10 is a schematic diagram of a tape drive system according to one embodiment of the present invention.

FIG. 10 illustrates a simplified tape drive system 1200 according to one embodiment of the present invention. While one specific implementation of a tape drive 1200 is shown in FIG. 10, it should be noted that various embodiments presented herein may be implemented in the context of any type of tape drive system.

As shown, a tape supply cartridge 1220 and a take-up reel 1221 are provided to support a tape 1222. These may form part of a removable cassette and are not necessarily part of the system 1200.

Guides 1221 guide the tape 1222 across a preferably bidirectional tape head 1226. An actuator 1232 controls position of the head 1226 relative to the tape 1222. The tape head 1226 is in turn coupled to a controller assembly 1228 via a connector cable 1230. The controller 1228, in turn, controls head functions such as servo following, write functions and read functions, etc. The controller 1228 runs under the control of computer instructions typically in firmware or software run locally or on a host system.

The tape drive 1200 may further include drive motor(s) 1224 to drive the tape supply cartridge 1220 and the take-up reel 1221 to move the tape 1222 over the head 1226. An interface may also be provided for communication between the tape drive and a host (integral or external) to send and receive the data and for controlling the operation of the tape drive and communicating the status of the tape drive to the host, all as will be understood by those of skill in the art. Examples of a host system include a computer or other processor-based system or network, etc. in communication with the tape drive 1200.

In another embodiment, the tape drive system is part of a larger library of tape drive systems that provide coordinated data backup using several drives.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic head, comprising:
   an array of elements, the elements being selected from a group consisting of data readers, data writers, and combinations thereof;
   wherein a first subset of the elements is operable for at least one of reading and writing data in a first tape format,
   wherein a second subset of the elements is operable for at least one of reading and writing data in a second tape format, at least some of the elements being present in both subsets,
   wherein a number of servo bands supported in each of the formats is one more than a number of data bands on a medium written in the particular format.

2. The head as recited in claim 1, wherein the elements are aligned laterally along a line transverse to the direction of travel of the magnetic medium over the head.

3. The head as recited in claim 1, wherein at least one element of the first array functions as a servo reader for the second array.

4. The head as recited in claim 1, further comprising servo readers associated with the array of elements, a number of the servo readers being no more than two times the number of formats.

5. The head as recited in claim 1, wherein no more than four servo readers are associated with the array of elements.

6. The head as recited in claim 1, wherein a number of elements in the first subset is the same as a number of elements in the second subset.

7. The head as recited in claim 1, wherein a number of elements in the first subset is different than a number of elements in the second subset.

8. A tape drive system, comprising:
   a magnetic head as recited in claim 1;
   a drive mechanism for passing a magnetic recording tape over the head; and
   a controller in communication with the head.

9. A magnetic head, comprising:
   a first array of elements associated with a first tape format, the elements of the first array being selected from a group consisting of data readers, data writers, and combinations thereof;
   a second array of elements interspersed with the first array of elements, the elements of the second array being selected from a group consisting of data readers, data writers, and combinations thereof, the second array of elements and a subset of the first array of elements being associated with a second tape format; and
   servo readers for reading servo bands on a tape,
   wherein a spacing of the servo bands on a tape written in the first format is different than a spacing of servo bands on a tape written in the second format.

10. The head as recited in claim 9, wherein the first and second arrays include data readers, the readers being aligned laterally along a line transverse to the direction of travel of the magnetic medium over the head.

11. The head as recited in claim 9, wherein the first and second arrays include data writers, the writers being aligned laterally along a line transverse to the direction of travel of the magnetic medium over the head.

12. The head as recited in claim 9, wherein the elements of both arrays have been formed in a same processing sequence.

13. The head as recited in claim 9, wherein at least one element of the first array functions as a servo reader for the second array.

14. The head as recited in claim 9, further comprising servo readers associated with each array of elements, a number of the servo readers being no more than two times the number of formats.

15. The head as recited in claim 9, wherein no more than two servo readers are associated with either array of elements.

16. The head as recited in claim 9, wherein a number of elements in the first array is the same as a number of elements in the second array plus the subset of the first array.

17. The head as recited in claim 9, wherein a number of elements in the first array is different than a number of elements in the second array plus the subset of the first array.

18. A tape drive system, comprising:
   a magnetic head as recited in claim 9;
   a drive mechanism for passing a magnetic recording tape over the head; and
   a controller in communication with the head.

19. A magnetic head, comprising:
   an array of elements, the elements being selected from a group consisting of data readers, data writers, and combinations thereof;
   wherein a first subset of the elements is operable for at least one of reading and writing data in a first tape format,
   wherein a second subset of the elements is operable for at least one of reading and writing data in a second tape format, at least some of the elements being present in both subsets,
   wherein the elements are aligned laterally along a line transverse to the direction of travel of the magnetic medium over the head,
   wherein a center-to-center spacing of the elements in the first subset of elements is at least one of an integer multiple and an integer ratio of a center-to-center spacing of the elements in the second subset of elements.

20. A tape drive system, comprising:
   a magnetic head as recited in claim 19;
   a drive mechanism for passing a magnetic recording tape over the head; and
   a controller in communication with the head.

* * * * *